May 31, 1927.
E. DAVIS
1,631,087
AUTOMATIC VEHICLE SPRING CONTROLLER
Filed March 27, 1926
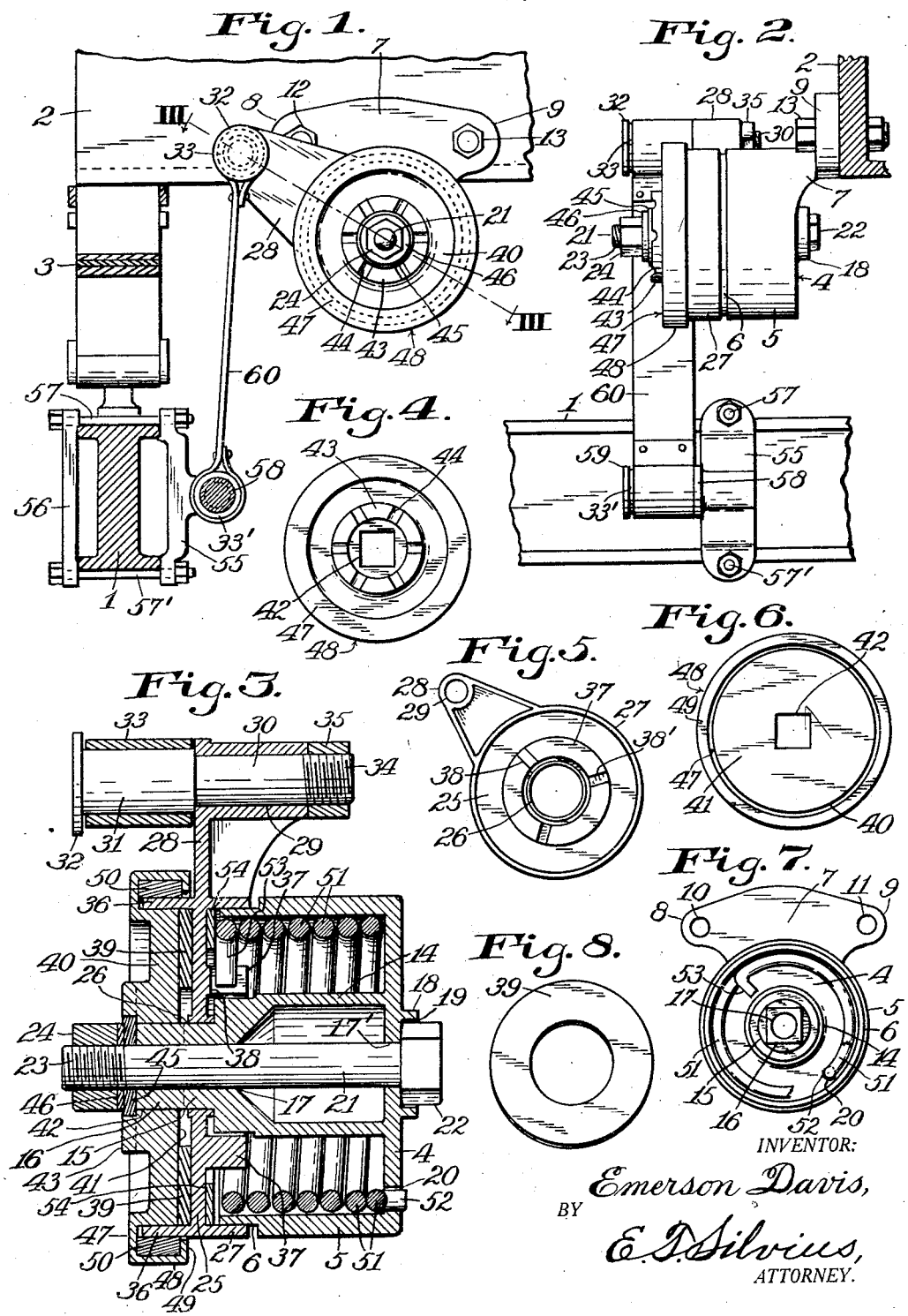
INVENTOR:
Emerson Davis,
BY
E. D. Silvius,
ATTORNEY.

Patented May 31, 1927.

1,631,087

UNITED STATES PATENT OFFICE.

EMERSON DAVIS, OF INDIANAPOLIS, INDIANA, ASSIGNOR OF ONE-HALF TO GEORGE P. RUTH, OF INDIANAPOLIS, INDIANA.

AUTOMATIC VEHICLE SPRING CONTROLLER.

Application filed March 27, 1926. Serial No. 98,028.

This invention relates to apparatus whereby to control action of vehicle springs, especially those of motor-vehicles, to modify the spring action on rough roads and particularly when the motor-vehicle is traveling at high speed.

An object of the invention is to provide an improved vehicle spring controller which shall be of simple and effective construction and adapted to be applied in various relations to vehicle structures, to gradually and smoothly retard the upward movement of a vehicle body caused by spring action.

Another object is to provide an improved vehicle spring controller which shall be of such construction as to be adapted to operate as a rebound check on automobiles and so constructed as to be adapted to be readily applied to existing automobiles, which shall be adapted to be slightly modified to permit it to be variously applied and which shall be substantial, durable and economical in use.

With the above-mentioned and other objects in view, the invention consists in an improved vehicle spring controller having co-operating spring and frictional resistance elements adapted to automatically operate with gradually increasing efficiency correspondingly to increasing needs for control; and further, the invention consists in various novel parts and combinations and arrangements of parts as hereinafter particularly described and further defined in the appended claims.

Referring to the drawings,—Figure 1 is a front view of the apparatus applied to well-known parts of a popular motor vehicle to illustrate one mode of application of the controller; Fig. 2 is an end view of Fig. 1; Fig. 3 is a section of the principal structure of the controller on an enlarged scale approximately on the line III—III in Fig. 1; Fig. 4 is a plan of the front plate or head which constitutes a frictional resistance element of the controller; Fig. 5 is a rear plan of a hub plate and lever arm comprised in the structure; Fig. 6 is a plan view of the inner side of the head or front plate; Fig. 7 is a front view of the housing part of the controller; and Fig. 8 is a perspective view of a friction washer comprised in the controller.

Similar reference characters in the different figures of the drawings indicate corresponding elements or features of construction herein referred to in detail.

In the drawings the numeral 1 indicates a common type of front axle bar of an automobile which may be of any conventional or special type, 2 indicating a frame side bar, and 3 a suitable front spring whereby the axle bar carries the vehicle frame, the spring and the frame for carrying the automobile machinery and body being shown as sufficient to illustrate the purposes of the invention and may be varied.

The controller structurally includes a housing comprising a back or bottom plate 4 and a hollow cylindrical body 5 integral therewith, the exterior usually being slightly rough as cast but has a true machined guide portion 6 adjacent to its end. One portion of the housing has a supporting bracket 7 off-set from the bottom 4, which may be of such shape as may be required to conform to the vehicle structure, the bracket having two opposite ears 8 and 9 provided with bolt holes 10 and 11 to receive bolts 12 and 13 respectively whereby to secure the housing in the desired place, preferably to a side bar of the vehicle frame. The housing has a central stud 14 cast integral with the back 4, the post preferably being cast hollow and it has a cylindrical guide portion 15 thereon from which a squared anchor portion 16 extends, the portions 15 and 16 having a bore 17 therein. The outer side of the back 4 has a boss 18 thereon in which is a socket recess 19 of suitable contour to conform to a bolt head, and the back 4 has also an aperture 20 adjacent to the wall portion, and a central bolt hole 17' in which a bolt 21 is arranged that extends through the bore 17 and has a head 22 on one end arranged in the recess and thereby prevented from turning. The bolt has screw threads 23 adjacent to its opposite end on which a nut 24 is operatively arranged.

A hub plate 25 of disk-like form has a central guide bore 26 that is arranged on the guide portion 15 of the stud and it has a rim flange 27 on one side thereof that receives the guide portion 6 of the housing body. The hub plate has a lever arm 28 cast thereon which has a bore 29 therein receiving the shank portion 30 of a wrist pin 31 having a flange 32 on one end, the wrist pin being seated against the arm and preferably having a bushing 33 rotatably arranged thereon. The shank has screw threads 34 adjacent to its end on which a nut 35 is screwed against the lever arm. The hub plate 25 has also a rim flange 36 on its opposite side, and on its inner side has a lug ring 37 integral therewith in which are a suitable number of notches 38, 38'. A friction washer 39 is arranged on the outer side of the hub plate within the flange 36 and preferably is composed of leather having a smooth front face, the rear face of the washer preferably being slightly rough so as to be adapted to slightly adhere and may be cemented to the hub plate to be turned thereby.

An improved housing head 40 is provided which is mainly disk-like and of suitable diameter to fit closely within the flange 36 and constitute a guide for the flange, the head preferably being composed of aluminum and having a smooth inner face 41, the head having a central squared aperture 42 receiving the squared portion 16 of the central stud whereby the head is prevented from rotating. The outer side of the head has an annular boss 43 which has a suitable number of radial grooves 44 in its face. A rubber cushion washer 45 is arranged on the bolt 21 and seated within the boss and preferably in contact with the end of the squared portion 16, the grooves permitting an expansion of the washer into them. A metallic washer 46 is arranged against the washer 45 and is engaged by the nut 24 whereby the face 41 is pressed with more or less force against the washer 39. Preferably the head is provided with a dust guard comprising an annular front plate 47 extending outward from the head 40 past the flange 36 and having a rim 48 thereon from which an annular back plate 49 extends inwardly towards the outer side of the flange 36 to constitute a boxing in which an annular elastic dust guard ring 50 is arranged so as to embrace the flange 36 and exclude dust from the housing.

A coil spring 51 is arranged within the housing and it has a lug 52 on one end thereof that extends into the aperture 20, the spring having also a lug 53 on its opposite end that extends inwardly into one of the notches 38, to resist movement of the lever arm 28 in one direction. The spring is designed to have contact with the housing back 4 and to have contact also with the hub plate 25 or preferably against a hardened metal washer 54 arranged between the spring and the hub plate to prevent the spring from wearing away the contact portions of the hub plate, the latter preferably being composed of brass.

An anchor bar 55 is provided which is adapted to be seated against the axle bar 1, a clamp plate 56 being arranged on the opposite side of the axle bar and connected to the anchor bar by means of bolts 57 and 57' whereby the anchor bar is rigidly secured in place. The anchor bar is provided with a lug pin 58 having a collar 59 thereon and preferably being provided with a bushing 33'. A preferably flexible link or strap 60 is connected to the bushings 33 and 33' whereby the lever arm 28 is operatively connected with the axle bar.

In practical use, when the vehicle body is thrust upward the upward movement is resisted by the link 60, the spring 51 and the head 40 with the washer 39. When the upward thrust of the body is extremely violent the spring 51 becomes more tightly wound and the coil slightly elongated so that increased pressure is transmitted to the frictional washer 39 which causes increased frictional resistance on the face 41 of the head, resulting in the gradual checking of the upward movement and therefore preventing the objectionable sudden stoppage of the upward movement. The nut 24 may be adjusted when adjustment of the frictional resistance is desired. When the vehicle is rapidly moving on a rough road, in case one of the vehicle wheels drops into a depression in the roadway the resulting descent of the axle is resisted by the link 60, momentum tending to carry the vehicle body forward and preventing its being suddenly pulled downward by the momentary fall of the axle. The spring 51 is to be properly adjusted to afford the required tension to constantly keep the link 60 taut. Readjustments will be advantageous with changing of loads on the vehicle body. Therefore easy riding may readily be attained under varying conditions of travel.

What is claimed as new is:

1. A vehicle spring controller having a lever arm and frictional resistance means and a single anchored and longitudinally expansible coil spring combined to retard movement of the lever arm and resist rebound action of the vehicle spring, and supporting means for the lever arm and also the frictional resistance means and the coil spring.

2. A vehicle spring controller having a lever arm provided with co-operating elastic and frictional resistance means including a longitudinally expansible coil spring to retard movement of the arm, and means to support the co-operating resistance means and anchor the coil spring to effect increasing frictional resistance upon excessive movement of the lever arm.

3. A vehicle spring controller having a lever arm provided with a longitudinally expansible coil spring and frictional resistance means co-operating with the spring to yieldingly resist movement of the lever arm in one direction, a housing to hold the spring and the resistance means, the housing anchoring one end of the spring, and a link connected to the lever arm.

4. A vehicle spring controller having a housing and a coil spring therein, one end of the spring being anchored to the housing, a lever having a hub rotatively guided on the housing and connected to the opposite end of the spring, a friction-contact disk yieldingly connected to the housing, and a friction-resistance washer between the disk and the lever hub in contact therewith.

5. A vehicle spring controller including a housing having a central stud and a head on the stud, a lever having a hub rotatively guided on the stud and movable longitudinally thereon, a coil spring seated in and anchored to the housing and bearing against the lever hub, and a frictional-resistance washer between the lever hub and the housing head in contact therewith.

6. A vehicle spring controller including a housing having a hollow cylindrical body and a central stud therein, a lever hub rotatively guided on the stud and having a rim flange on the front thereof, a head on the inside of the flange and supported on the stud, the head having an annular dust-guard box thereon that extends over the flange, an annular dust-guard in the box and embracing the flange, and a coil spring anchored in the housing and connected to the lever hub.

7. A vehicle spring controller including a housing having a bracket thereon to support it, a hub and a lever arm thereon, the hub being rotatively arranged on the housing, a coil spring in the housing anchored thereto and connected to the hub, a stud rigidly connected to the housing and extending through the hub in guiding connection therewith, a head mounted on the stud outside the hub, an anchor bar having a lug pin thereon, a clamp bar and bolts to cooperate with the anchor bar, and a link connected with the lever arm and the lug pin.

8. A vehicle spring controller including a housing having a hollow central stud therein, a lever hub rotatively guided on the stud, a coil spring anchored in the housing and connected to the hub, a head arranged on the stud outside the hub and movable longitudinally of the stud, means preventing rotation of the head on the stud, a frictional-resistance washer between the hub and the head in contact therewith, a bolt connected to the housing and extending through the stud, an elastic washer seated on the outer side of the head, a metal washer bearing on the elastic washer, and a nut on the bolt bearing on the metal washer.

9. In a vehicle spring controller, the combination with a cylindrical housing and a stud fixed therein, of a lever hub rotatively guided on the stud and having a rim flange thereon extending about the housing, the inner side of the hub having a relatively hard washer thereon at the inner side of the flange, and a coil spring seated in the housing and anchored thereto and connected with the lever hub, the spring bearing against said washer.

10. In a vehicle spring controller, the combination of a housing having a bracket thereon to support it, a stud rigidly connected to the housing, a lever hub rotatively guided on the stud, a coil spring anchored to the housing and connected to the hub to rotate the hub in one direction, a head mounted on the stud and cushioned to yield outwardly from the hub, and a frictional-resistance washer carried by the hub in sliding contact with the head to constantly resist rotation of the hub.

11. In a vehicle spring controller, the combination of a housing comprising a back plate and a cylindrical body integral therewith, a stud connected to said plate, a lever hub rotatively guided on the stud and having a guide flange on its outer side, the hub having a rim flange on its opposite side to close the housing body, a coil spring anchored to said back plate and connected to the lever hub, and a head mounted on the stud outside the hub and provided with a dust-guard cooperating with said guide flange.

12. In a vehicle spring controller, the combination, with a housing having a bracket to support it, of a hub rotatively guided on the housing and having a lever arm thereon, a coil spring anchored to the housing and connected to the hub, the spring being tensioned to turn the hub in one direction, an anchorage device, a link connected with the lever arm and the anchorage device to turn the hub in the opposite direction, and frictional-resistance means operating on the hub to frictionally resist action of the coil spring.

13. In a vehicle spring controller, the combination of a housing comprising a back plate and a cylindrical body integral therewith, a stud supported on said plate, a lever hub rotatively guided on the stud and having a flange guided on said body, the hub having also a lug boss on its inner side, a coil spring arranged within said body and bearing against said back plate and said hub, the spring being anchored to the plate and connected to the lug boss, and a head mounted on the stud and assisting in guiding the lever hub.

14. In a vehicle spring controller, the combination of a housing comprising a back plate and a cylindrical body, a hollow stud rigidly connected to said back plate and having a cylindrical portion and a squared portion, a lever hub rotatively guided on said cylindrical portion, a coil spring anchored to said back plate and connected to said hub, a head having a squared hole and arranged on said squared portion, a frictional-resistance washer carried by said hub in sliding contact with said head, a bolt connected to said back plate and extending through said stud, a cushion washer on said bolt seated on the outer side of said head, a metal washer on the cushion washer, and a nut on the bolt in contact with the metal washer.

In testimony whereof, I affix my signature on the 23rd day of March, 1926.

EMERSON DAVIS.